(12) United States Patent
Lee et al.

(10) Patent No.: US 6,337,714 B1
(45) Date of Patent: Jan. 8, 2002

(54) METHOD FOR CONTROLLING AUTO FOCUSING OF A CAMERA

(75) Inventors: Seoung-Eog Lee; Jin-Soo Park; Myung-Keun Yeo, all of Kyungki-do (KR)

(73) Assignee: L G Electronics Inc., Seoul (KR)

( * ) Notice: Subject to any disclaimer, the term of this patent is extended or adjusted under 35 U.S.C. 154(b) by 0 days.

(21) Appl. No.: 08/998,079

(22) Filed: Dec. 24, 1997

(30) Foreign Application Priority Data

Dec. 27, 1996 (KR) .............................. 96-73871

(51) Int. Cl.[7] ..................... H04N 5/235; H04N 5/262; H04N 9/64
(52) U.S. Cl. ..................... 348/345; 348/240; 348/347; 348/229
(58) Field of Search ................... 348/240, 345, 348/347, 349, 353, 354, 356, 357, 358, 229; 250/201.2, 201.3

(56) References Cited

U.S. PATENT DOCUMENTS

| | | | | |
|---|---|---|---|---|
| 4,365,272 A | * | 12/1982 | Nagai ........................ 348/229 |
| 4,532,553 A | * | 7/1985 | Brill ........................... 348/229 |
| 5,083,209 A | * | 1/1992 | Inoue et al. ................ 348/296 |
| 5,258,848 A | * | 11/1993 | Kondo et al. ............... 348/229 |
| 5,739,857 A | * | 4/1998 | Kaneda ....................... 348/349 |
| 5,793,526 A | * | 8/1998 | Schalz ........................ 359/392 |
| 5,923,371 A | * | 7/1999 | Iijima ......................... 348/356 |
| 5,933,187 A | * | 8/1999 | Hirasawa et al. .......... 348/240 |
| 6,034,726 A | * | 3/2000 | Hirota et al. ............... 348/347 |

* cited by examiner

*Primary Examiner*—Wendy R. Garber
*Assistant Examiner*—Rashann N. Tillery
(74) *Attorney, Agent, or Firm*—Finnegan, Henderson, Farabow, Garrett & Dunner LLP

(57) ABSTRACT

A method for controlling auto focusing of a camera, which heretofore involved severe hunting phenomena in the case of a low depth of focus due to arbitrarily determining a wobbling width of a focus lens free from the depth of focus (iris opening), utilizes an opening of an iris and position of a zoom lens. The iris opening and zoom position are detected to variably control the wobbling width of the auto focusing, thereby improving the auto focusing speed. This minimizes wobbling and prevents hunting in the case of a low depth of focus.

5 Claims, 5 Drawing Sheets

METHOD FOR CONTROLLING AUTO FOCUSING OF A CAMERA

BACKGROUND OF THE INVENTION

1. Field of the Invention

The present invention relates to an auto focusing control technique of a camera, and more particularly to a method for controlling auto focusing of a camera for variably selecting a wobbling width in accordance with the position of a zoom lens and opening of an iris.

2. Description of the Prior Art

A technique for controlling auto focusing of a camera is to detect a subject by using a luminance signal of the subject that is picked up via a camera lens, and driving an optical system to be fitted to the detected subject, thereby automatically adjusting its focus. FIG. 1 schematically illustrates a circuit construction for controlling auto focusing of a camera.

Here, an optical system 10 includes an objective lens 10a, a zoom lens 10a, an iris 10c and a focusing lens 10d, and a photoelectric converting unit, i.e. CCD 20, converts an image of a subject picked up via optical system 10 into an electric signal. Additionally, an automatic gain controlling (hereinafter simply referred to as "AGC") circuit 30 carries out automatic gain controlling of a video signal converted by photoelectric converting unit 20. A digital signal processing section 40 digitizes the AGC-processed video signal and separates it into a luminance signal and a chrominance signal to process the obtained signals, and an evaluation value detecting section 50 detects an evaluation value for the focusing controlling by using the luminance signal separated in digital signal processing section 40. In addition to these, a controlling section 60 judges whether the subject is detected or not by means of the evaluation value detected in evaluation value detecting section 50 and provides a focusing area control signal and an optical system driving control signal in accordance with the result of the determination, and a focus motor driving section 70a receives the lens driving control signal from controlling section 60 to provide a focusing lens driving signal. A focus motor 80a drives focusing lens 10d in response to the focus motor driving signal, and an iris motor driving section 70b receives an iris driving control signal from controlling section 60 to provide an iris motor driving signal. Also included are an iris motor 80b for driving iris 10c in accordance with the iris motor driving signal, and a zoom motor driving section 70c for receiving a zoom driving control signal from controlling section 60 to provide a zoom motor driving signal. Further to these, a zoom motor 80c drives zoom lens 10b in accordance with the zoom motor driving signal, an exposure detecting section 90 detects the opening of iris 10c to supply it into controlling section 60, and a zoom position detecting section 100 detects the position of zoom lens 10b to supply it to controlling section 60.

The image picked up by optical system 10 is converted into the electric video signal in photoelectric converting unit 20 via objective lens 10a, zoom lens 10b, iris 10c and focusing lens 10d. Then, the obtained video signal is automatically gain-controlled by AGC circuit 30 to be supplied into digital signal processing section 40.

Digital signal processing section 40 converts an input analog video signal into a digital signal, and separates the digital video signal into luminance signal Y and chrominance signal C. Thus, separated chrominance signal C is processed via a chrominance signal processor (not shown), and luminance signal Y is processed via a luminance signal processor (not shown), thereby providing a composite video signal CVS.

At this time, evaluation detecting section 50 receives the processed luminance signal to supply a luminance signal evaluation value of the subject image to controlling section 60 which in turn performs the control, such as auto focusing and auto exposure, based on the evaluation value supplied.

In the conventional auto focusing technique, however, the transferring speed and wobbling width of the focus lens are determined unrelated to a depth of focus.

Here, the depth of focus $F_{NO}$ is defined by an equation $F_{NO}=f/D$ (where f denotes a focal length by the zoom, and D denotes a diameter of the employed lens in accordance with the iris opening), which has a proportional relation to the iris opening.

That is, the larger the iris opening, the lower the depth of focus. Whereas, the smaller the iris opening, the larger the depth of focus.

But the wobbling width and lens transferring speed were heretofore controlled regardless of the depth of focus in the conventional auto focusing controlling technique.

More specifically, as shown in FIG. 2, focus motor 80a is controlled via focus motor driving section 70a by the wobbling width which is fixed to an optional focus position to drive focusing lens 10d, thereby deciding the auto focusing direction. Then, after focusing lens 10d is driven to be matched to the decided direction to track until reaching a peak point mode, the focus position is set at a peak point Zo at which the detected luminance signal evaluation value becomes decreased after being increased.

When the focusing operation is performed in the conventional auto focusing controlling technique, the focus lens speed is heretofore determined by the fixed wobbling width unrelated ti the depth of focus to thereby involve distinctive hunting phenomena in case of a low depth of focus.

SUMMARY OF THE INVENTION

The objects of the present invention are to overcome problems and disadvantages of the conventional method for controlling camera autofocusing Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

A first object of the present invention is to provide a method for controlling auto focusing of a camera, wherein an iris opening and a zoom position are detected to select a variable wobbling width in accordance with the result of the detection for preventing the hunting associative with a state of a depth of focus and enabling a quick auto focusing operation.

A second object of the present invention is to provide a method for controlling auto focusing of a camera, wherein an iris opening and a zoom position are detected to select a variable wobbling width in accordance with the result of the detection. An iris is controlled to allow the selected wobbling width to have a preset reference value prior to performing am auto focusing operation, thereby preventing the hunting and enabling a quick auto focusing operation.

A third object of the present invention is to provide a method for controlling auto focusing of a camera, wherein an iris opening is detected to have a preset reference value by controlling an iris. A variable wobbling width is selected in accordance with the result of the detection for performing an auto focusing operation, thereby preventing the hunting and enabling a quick auto focusing operation.

To achieve the first object of the present invention, the first embodiment of the present invention provides a method for controlling auto focusing of a camera, which is performed by detecting an opening of an iris and a zoom position of a zoom lens, and selecting a wobbling width based on the detected iris opening and zoom position. Thereafter, transferring a focus lens based on the selected wobbling width is carried out.

To achieve the second object of the present invention, a second embodiment of the present method detects an opening of an iris and a zoom position of a zoom lens and selects a first wobbling width based on the detected iris opening and zoom position. The selected first wobbling width is compared with a reference value, and the opening of the iris is controlled to a new opening in accordance with a result of the comparison. A second wobbling width corresponding to the new opening is selected, and a focus lens is transferred based on one of the selected first and second wobbling widths in accordance with the result of the comparison.

In order to achieve the third object of the present invention, the third embodiment of the present method detects an opening of an iris and compares an iris value representing the detected opening of the iris with a predetermined reference value. The opening of the iris is adjusted in accordance with a result of the comparison. A zoom position of a zoom lens is detected when the adjusted iris opening exceeds the reference value, and a wobbling width is selected based on the adjusted iris opening and the detected zoom position. A focus lens is transferred based on the selected wobbling width.

In the above-described embodiments, the step of selecting the wobbling width may be performed by selecting any one among a plurality of wobbling widths previously stored in a memory corresponding to a depth of focus based on the iris opening and zoom lens position.

Preferably, the plurality of wobbling widths may have at least a first wobbling width selected when the iris opening is large and zoom position is close, a second wobbling width selected when the iris opening is small and zoom position is close or selected when the iris opening is large and zoom position is remote, and a third wobbling width selected when the iris opening is small and zoom position is remote.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Figure 4:
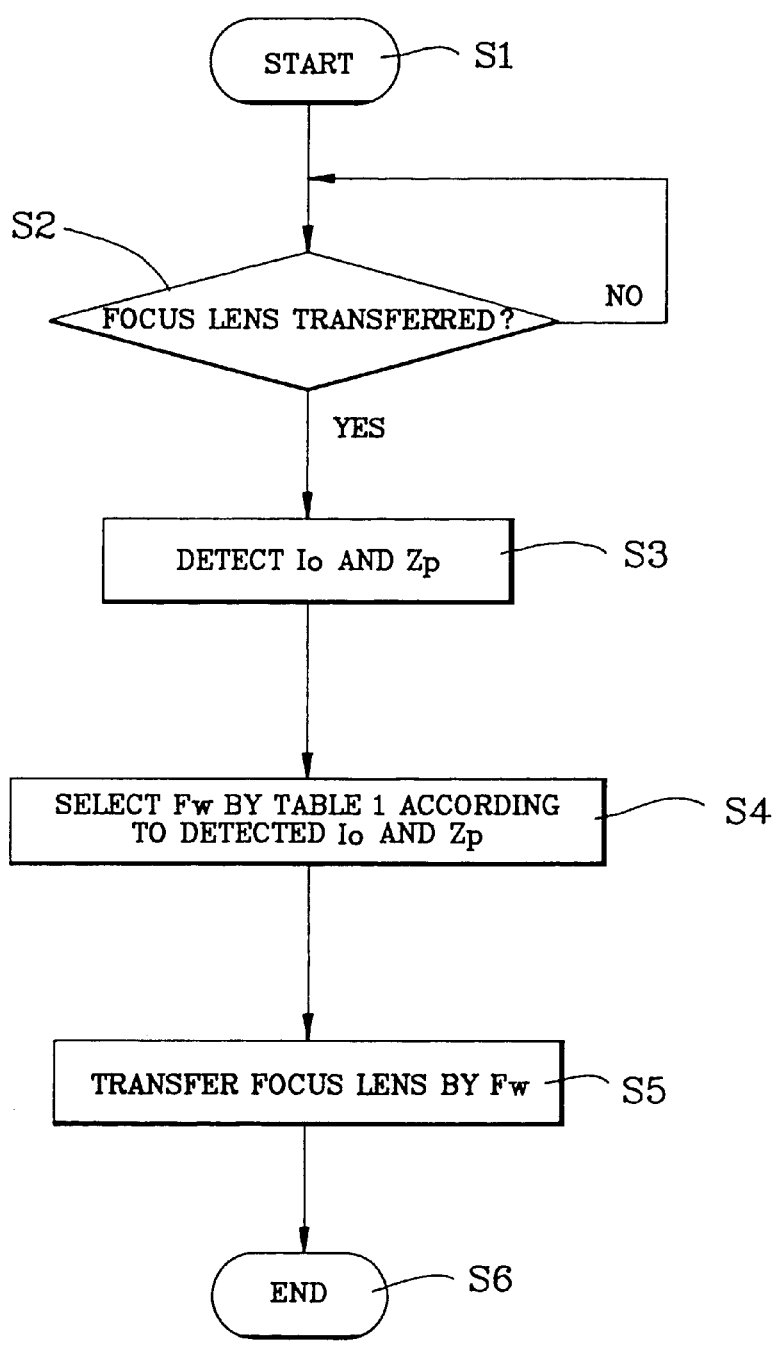
FIG. 4 is a flowchart showing a first embodiment of the method for controlling auto focusing according to the present invention.

FIG. 4 is a flowchart showing a first embodiment of the method for controlling auto focusing according to the present invention.

As shown in FIG. 4, the first embodiment of the method for controlling auto focusing according to the present invention is performed by steps of detecting an opening $I_o$ of an iris 10c and a zoom position $Z_p$ by a zoom lens 10b when transferring a focus lens; selecting a wobbling width $F_w$ based on detected iris opening $I_o$ and zoom position information; and then transferring the focus lens to selected wobbling width $F_w$.

The sequence of controlling the auto focusing of the first embodiment of the present method provided as above will be described below.

To begin with, when the power is on in step S1, it is judged whether the lens is transferred for performing a focusing operation in an optional focus position or not in step S2 while controlling by a default value $F_w$. When focus lens motion is executed, opening $I_o$ of iris 10c is detected in exposure detecting section 90 and position $Z_p$ of zoom lens 10b is detected in zoom position detecting section 100 in step S3.

Figure 1:
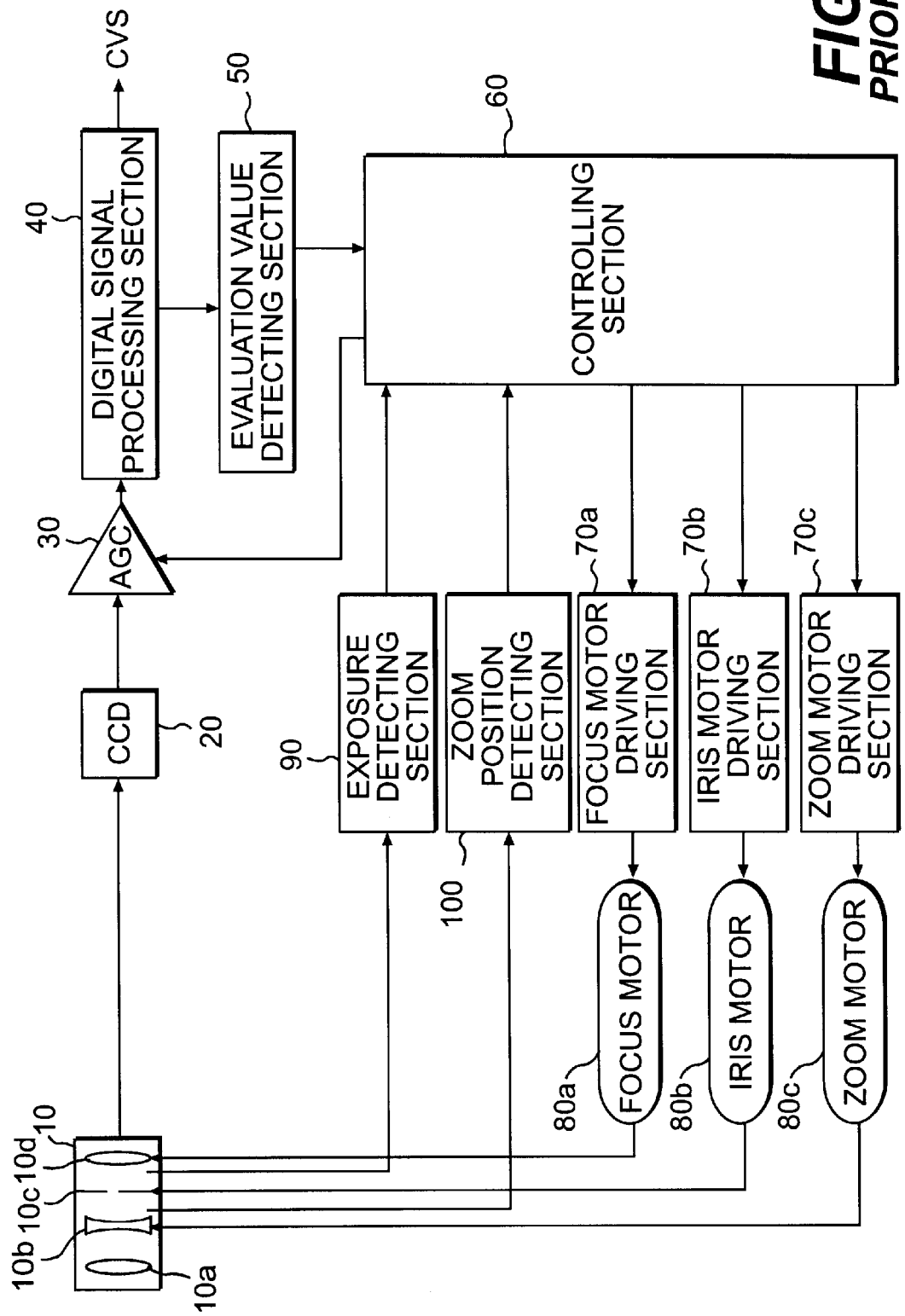
FIG. 1 is a block diagram showing a construction of a conventional apparatus for controlling auto focusing of a camera.
Figure 2:
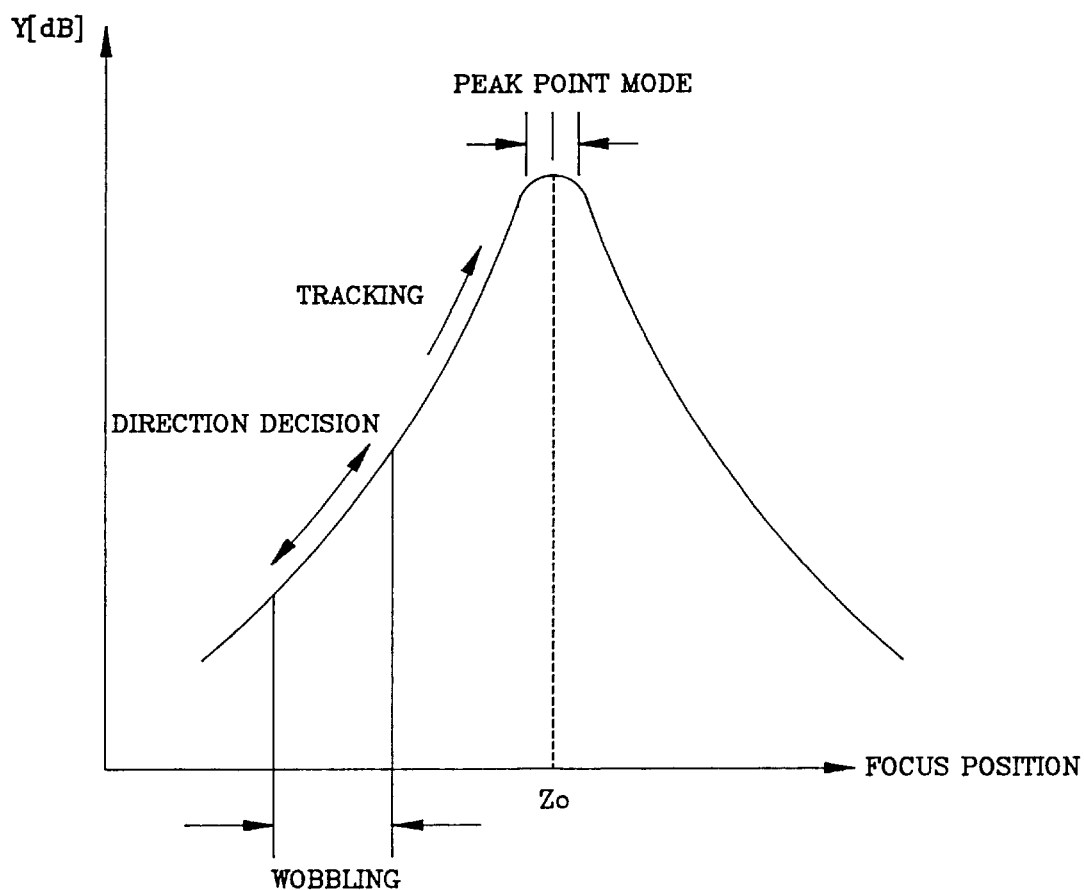
FIG. 2 is a graph representation plotting positions of the focus lens and subject luminance signal levels detected at respective positions thereof for explaining the subject tracking and focusing operations.
Figure 3:
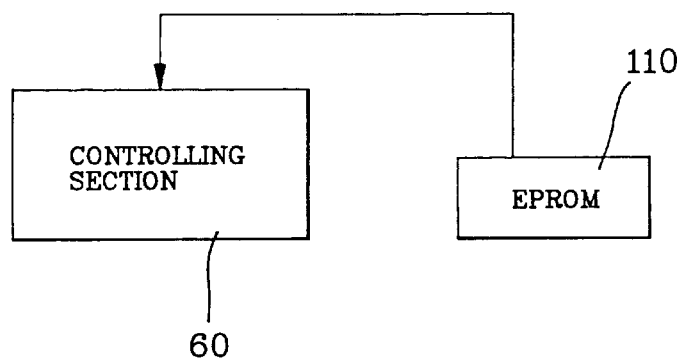
FIG. 3 is a block diagram showing a construction of an apparatus for controlling auto focusing of a camera used for a method for controlling auto focusing according to the present invention.

In step S4, any one among wobbling widths $F_{w1}$, $F_{w2}$ and $F_{w3}$ which are identical to those of FIG. 1 as shown in Table 1 stored in an EPROM 110 shown in FIG. 3, except that EPROM 110 is connected to controlling section 60, is selected in accordance with opening $I_o$ of iris 10c and zoom position $Z_p$ by using opening $I_o$ and zoom position $Z_p$ detected in step S3. Wobbling widths $F_{w1}$, $F_{w2}$ and $F_{w3}$ are previously stored in EPROM 110 corresponding to a depth of focus based on iris opening $I_o$ and zoom lens position $Z_p$, and the relation of the wobbling widths are defined by $F_{w1} < F_{w2} < F_{w3}$.

In step S5, the focus lens is transferred by wobbling width $F_w$ selected in step S4.

TABLE 1

| $Z_p \backslash I_o$ | Large | Small |
| --- | --- | --- |
| Close | $W_1$ | $W_2$ |
| Remote | $W_2$ | $W_3$ |

By controlling the auto focusing as above, the driving control of the focus lens is performed by considering the depth of focus. Accordingly, the hunting phenomena at the peak point mode is prevented and the speedy auto focusing can be carried out.

Figure 5:
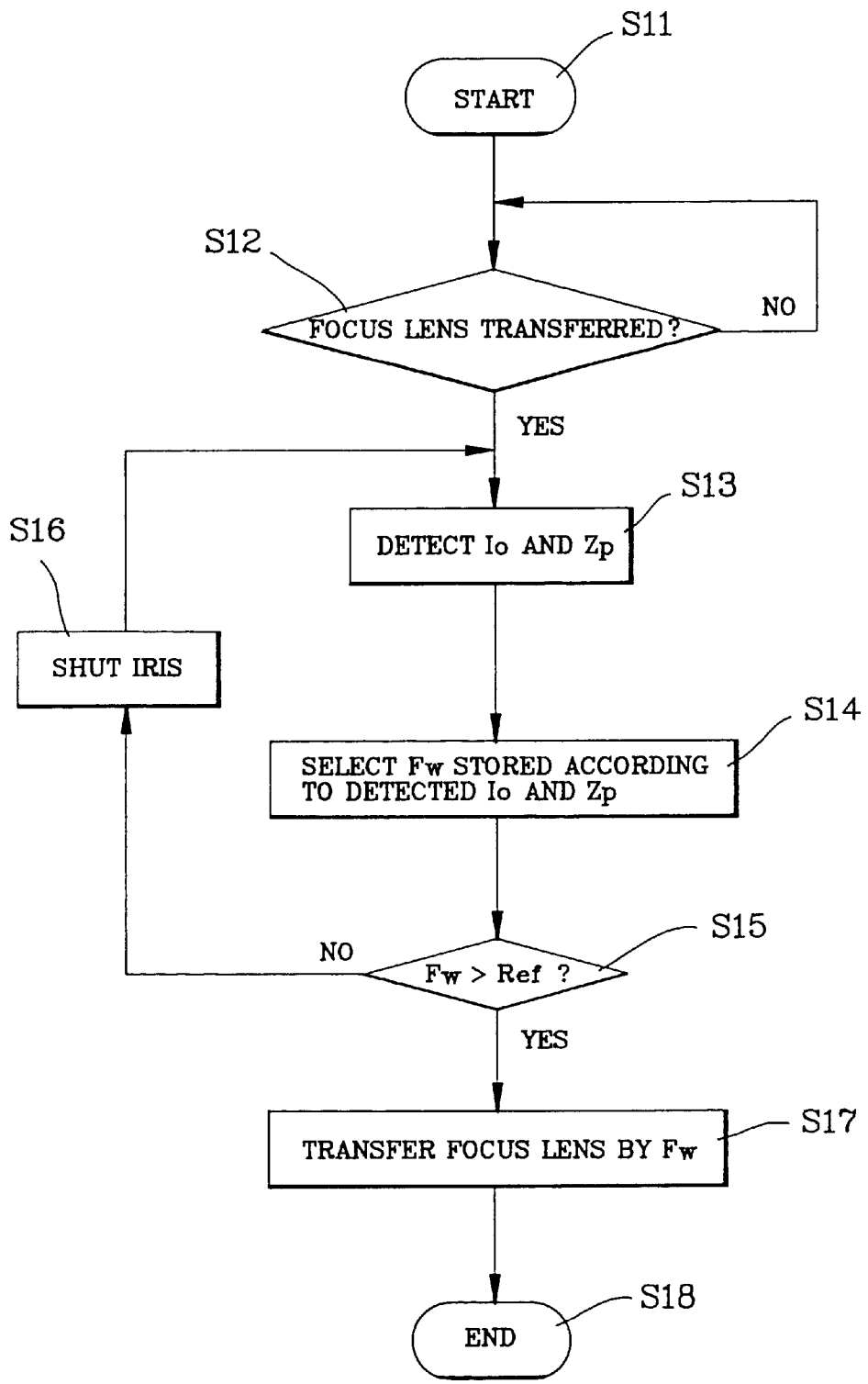
FIG. 5 is a flowchart showing a second embodiment of the method for controlling auto focusing according to the present invention.

FIG. 5 is a flowchart showing a second embodiment of the method for controlling auto focusing according to the present invention.

As shown in FIG. 5, the second embodiment of the method for auto focusing according to the present invention is performed by a step of detecting an opening $I_o$ of iris 10c and a zoom position $Z_p$ by zoom lens 10b during transferring focus lens 10d, and a step of selecting a wobbling width $F_w$ based on the detected iris opening and zoom position information. In a successive step, selected wobbling width $F_w$ is compared with a reference value, and iris 10c is controlled to have a new opening in accordance with the result of the comparison to select a new wobbling width $F_w$ corresponding to the new iris opening. Then, focus lens 10d is transfer by the selected new wobbling width $F_w$ which is larger than the reference value.

The sequence of controlling the auto focusing of the second embodiment of the present method provided as above will be described below. In the second embodiment, the auto focusing control is performed by providing a wobbling width larger than a prescribed value.

When the power is on in step S11, it is judged whether or not the lens is transferred for performing the focusing operation in an optional focus position or not in step S12 while controlling by a default value $F_w$. When focus lens motion is executed, opening $I_o$ of iris 10c is detected in exposure detecting section 90 and position $Z_p$ of zoom lens 10b is detected in zoom position detecting section 100 in step S13.

In step S14, any one among wobbling widths $F_{w1}$, $F_{w2}$ and $F_{w3}$, as shown in Table 1 stored in EPROM 110 shown in FIG. 3, is selected in accordance with opening $I_o$ of iris 10c and zoom position $Z_p$ by using opening 10 and zoom position $Z_p$ detected in step S13 to be identical to the first embodiment.

In step S15, selected wobbling width $F_w$ is compared with a preset predetermined reference value Ref, so that iris 10c is controlled to decrease the opening thereof in step S16 when wobbling width $F_w$ is below reference value Ref. At this time, it is assumed that, since the picture composition is differed, the zoom position is not to be changed. Then, after newly selecting wobbling width $F_w$ from the new iris opening and zoom position, the step of comparing the selected wobbling width $F_w$ with reference value Ref is repeated until wobbling width $F_w$ exceeds reference value Ref.

Once wobbling width $F_w$ exceeds reference value Ref by carrying out the above step, in step S17, focus lens 10d is transferred by wobbling width $F_w$ to perform the auto focusing control. That is, wobbling width $F_w$ is to be over the prescribed value to perform the auto focusing control.

On the other hand, during the step of controlling iris opening $I_o$ by comparing wobbling width $F_w$ with reference value Ref, it is possible to simultaneously perform a step of increasing or decreasing the AGC in accordance with the depth of focus by controlling AGC circuit 3.

In more detail, when wobbling width $F_w$ is below reference value Ref in the low illuminance, AGC circuit 3 is controlled to increase the AGC. Otherwise, the AGC is decreased to impose a proper AGC corresponding to iris opening $I_o$ to enable further effective auto focusing.

Figure 6:
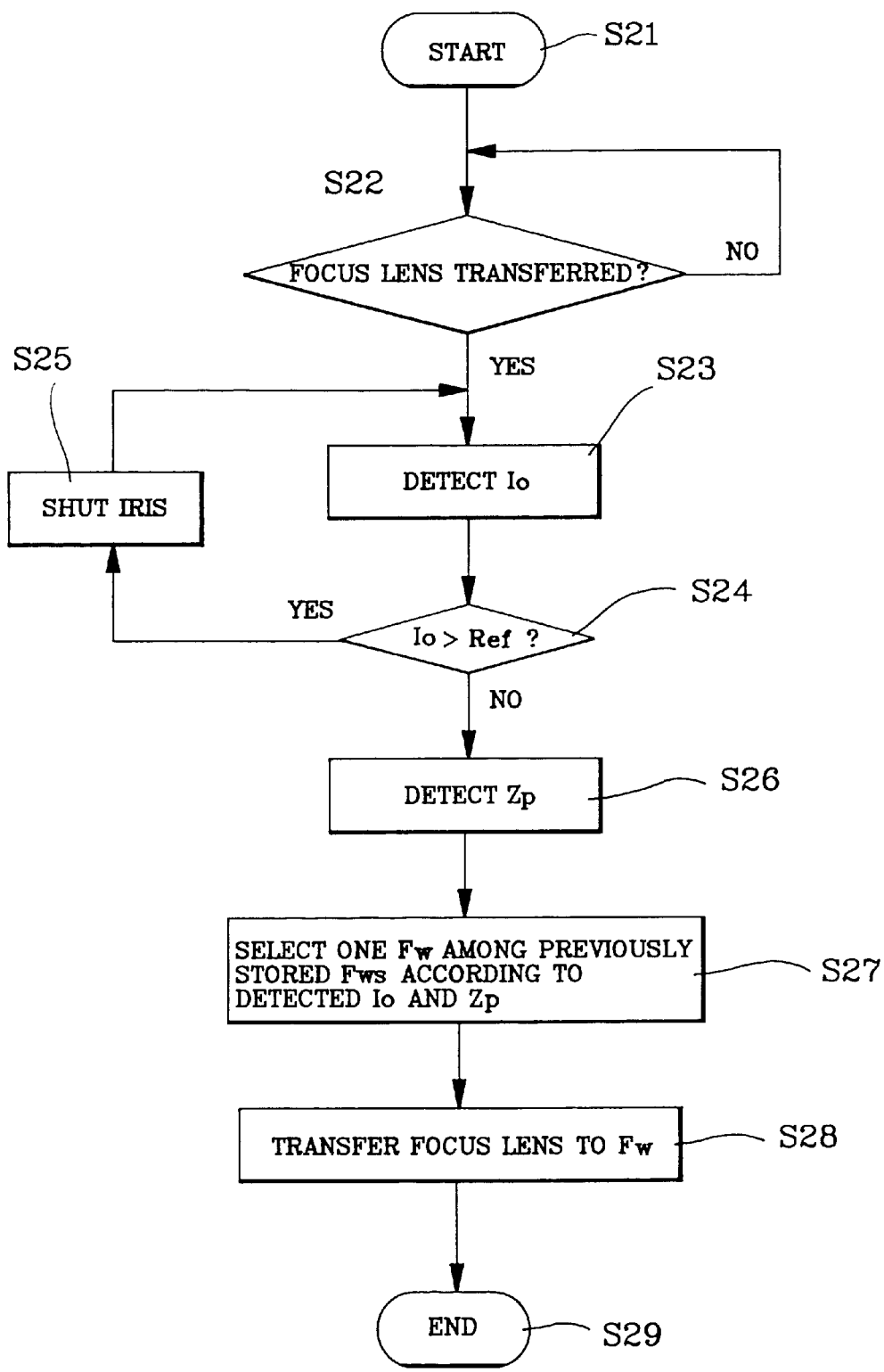
FIG. 6 is a flowchart showing a third embodiment of the method for controlling auto focusing according to the present invention.

FIG. 6 is a flowchart showing a third embodiment of the method for controlling auto focusing according to the present invention.

As shown in FIG. 6, the third embodiment of the method for controlling auto focusing of the camera is performed by a step of detecting an opening $I_o$ of iris 10c during transferring focus lens 10d to be compared with a predetermined reference value Ref and adjusting iris opening $I_o$ in accordance with the result of the comparison, and a step of detecting a zoom position $Z_p$ by the zoom lens once the adjusted iris opening exceeds the reference value. Thereafter, a step of selecting a wobbling width $F_w$ based on the adjusted iris opening and detected zoom position information, and a step of transferring focus lens 10d by the selected wobbling width $F_w$ are carried out.

The sequence of controlling the auto focusing of the third embodiment of the present method provided as above will be described below.

First, when the power is on in step S21, it is judged whether or not the lens is transferred for performing the focusing operation in an optional focus position or not in step S22 while controlling by a default value $F_w$. When focus lens motion is executed, opening $I_o$ of iris 10c is detected in exposure detecting section 90, and detected iris opening $I_o$ is compared with predetermined reference value Ref.

When the comparison result is that iris opening $I_o$ exceeds reference value Ref (in case of the low illuminance), iris 10c is controlled to decrease the opening $I_o$. In this manner, a step of comparing a new iris opening $I_o$ with reference value Ref is repeated until iris opening $I_o$ reaches a target value.

If iris opening $I_o$ becomes smaller than reference value Ref (high illuminance) by executing the above steps, zoom position detecting section 100 detects zoom position $Z_p$ of zoom lens 10b in step S26.

Successively, in step S27, any one among wobbling widths $F_{w1}$, $F_{w2}$ and $F_{w3}$ as shown in Table 1 stored in EPROM 110 shown in FIG. 3 is selected in accordance with lastly-detected opening $I_o$ of iris 10c and zoom position $Z_p$ by using opening $I_o$ and zoom position $Z_p$ to be identical to the first embodiment.

In step S28, focus lens 10d is transferred by wobbling width $F_w$ selected in step S27 to perform the auto focusing control.

On the other hand, during the step of controlling iris opening $I_o$ by being compared with wobbling width $F_w$, it is possible to simultaneously perform a step of increasing or decreasing the AGC in accordance with the depth of focus by controlling AGC circuit 3.

In more detail, when iris opening $I_o$ exceeds reference value Ref in the low illuminance, the depth of focus is of the low. Therefore, AGC circuit 30 is controlled to increase the AGC. Otherwise, the AGC is decreased to impose a proper AGC corresponding to iris opening $I_o$ to enable to perform the further effective auto focusing.

By employing the method for controlling auto focusing of the camera according to the present invention as described above, the wobbling width can be variably set responsive to the corresponding depth of focus by using the detected iris opening and zoom position to be especially useful for preventing hunting during the auto focusing incited due to the low depth of focus.

Furthermore, the iris is controlled in case of the low depth of focus to intensify the depth of focus, so that hunting can be prevented during the auto focusing while improving the focusing speed.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for controlling auto focusing of a camera, comprising:

detecting an opening of an iris;

comparing an iris value representing said detected opening of the iris with a reference value;

adjusting an AGC in accordance with a result of the comparison;

adjusting said opening of the iris to reach a target value in accordance with a result of said comparison and said AGC adjustment;

detecting a zoom position of a zoom lens when said adjusting step of the iris opening is completed;

selecting a wobbling width based on said adjusted iris opening and the detected zoom position; and transferring a focus lens based on the selected wobbling width.

2. A method for controlling auto focusing of a camera as claimed in claim 1, wherein said selecting a wobbling width includes storing a plurality of wobbling widths in a memory; and selecting one of said stored plurality of wobbling widths corresponding to a depth of focus based on said iris opening and zoom lens position.

3. A method for controlling auto focusing of a camera as claimed in claim 2, wherein said selecting one of said stored plurality of wobbling widths includes selecting a first wobbling width when said iris opening is large and zoom position is close;

selecting a second wobbling width when said iris opening is small and zoom position is close or when said iris opening is large and zoom position is remote; and selecting a third wobbling width when said iris opening is small and zoom position is remote.

4. A method for controlling auto focusing of a camera as claimed in claim 3, wherein said first wobbling width is less than said second wobbling width, which is less than said third wobbling width.

5. A method for controlling auto focusing of a camera as claimed in claim 1, wherein said adjusting an AGC includes:

decreasing a gain if the iris value is smaller than the reference value and the AGC value is not zero; and increasing a gain if the iris value is larger than the reference value and the AGC value is not maximum.

* * * * *